(12) United States Patent
Aggarwal et al.

(10) Patent No.: US 8,799,349 B2
(45) Date of Patent: Aug. 5, 2014

(54) METHOD, SYSTEM AND APPARATUS FOR PROPAGATING DATA CHANGE NOTIFICATIONS

(75) Inventors: Ankur Aggarwal, Redwood City, CA (US); Jasjit Singh, Redwood City, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 430 days.

(21) Appl. No.: 12/708,355

(22) Filed: Feb. 18, 2010

(65) Prior Publication Data

US 2011/0202588 A1    Aug. 18, 2011

(51) Int. Cl.
*G06F 15/16* (2006.01)
(52) U.S. Cl.
USPC ........... 709/202; 709/203; 709/223; 709/224; 709/232
(58) Field of Classification Search
USPC ................... 705/1.1, 14.41, 37; 709/202, 203
See application file for complete search history.

(56) References Cited

U.S. PATENT DOCUMENTS

| | | | |
|---|---|---|---|
| 8,146,101 B2* | 3/2012 | Yulo | 719/318 |
| 2004/0210511 A1* | 10/2004 | Waelbroeck et al. | 705/37 |
| 2004/0225693 A1 | 11/2004 | Ganji | |
| 2005/0176453 A1 | 8/2005 | Yach | |
| 2006/0026198 A1 | 2/2006 | Emery | |
| 2006/0095397 A1 | 5/2006 | Torres et al. | |
| 2006/0101082 A1* | 5/2006 | Agrawal et al. | 707/200 |
| 2007/0112856 A1 | 5/2007 | Schram | |
| 2008/0005117 A1 | 1/2008 | Yulo | |
| 2009/0089342 A1 | 4/2009 | Runstedler | |
| 2009/0254971 A1* | 10/2009 | Herz et al. | 726/1 |

FOREIGN PATENT DOCUMENTS

EP      1650674 A1     4/2006

OTHER PUBLICATIONS http://www.cs.washington.edu/research/projects/aiweb/media/papers/uist09.pdf "Bonfire: A Nomadic System for Hybrid Laptop-Tabletop Interaction"—Kane et al, Oct. 2006, UW.*
http://googlesystem.blogspot.com/2010/06/built-in-pdf-reader-for-google-chrome.html "Built-in PDF Reader for Google Chrome"—Google, Jun. 2010.*
EESR; European App. No. 10154023.5; mailed Sep. 20, 2010.
eBay: Mobile—Mobile Web, eBay.com, http://pages.ebay.com/mobile/mobileweb.html, retrieved on Feb. 18, 2010.
eBay on iPhone, eBay, http://pages.ebay.com/mobile/iphone.html, retrieved on Feb. 18, 2010.

(Continued)

*Primary Examiner* — Randy Scott
(74) *Attorney, Agent, or Firm* — Schwegman Lundberg & Woessner, P.A.

(57) ABSTRACT

A system, method and apparatus for propagating data change notifications are provided. The system comprises a computing device in communication with an intermediation server via a network, the intermediation server in communication with an originating content server. A data change notification is received at the computing device from the intermediation server, the data change notification comprising an indication that a change has occurred to data at the originating content server. The data change notification is stored in a destination location at the computing device. The destination location is checked for data change notifications; and, when the data change notification is found, an indicator is controlled to indicate that a change has occurred to the data.

29 Claims, 13 Drawing Sheets

(56) References Cited

OTHER PUBLICATIONS

Bonfire—Products, Bonfire Media, http://www.bonfiremedia.com/es/s/Ctrl?Command=ws products, retrieved on Feb. 18, 2010.

Google Reader, http://www.google.com/support/reader/bin/answer.py?answer=113517, retrieved on Mar. 2, 2010.

"European Application Serial No. 10154023.5, Office Action mailed Jan. 20, 2012", 5 pgs.

"European Application Serial No. 10154023.5, Response filed May 10, 2012 to Office Action mailed Jan. 20, 2012", 6 pgs.

"Canadian Application Serial No. 2,731,822, Office Action mailed Feb. 12, 2013", 3 pgs.

"Canadian Application Serial No. 2,731,822, Office Action mailed Nov. 7 ,2013", 3 pgs.

"Canadian Application Serial No. 2,731,822, Response filed Aug. 9, 2013 to Office Action mailed Feb. 12, 2013", 9 pgs.

"European Application Serial No. 10154023.5, Amendment filed Dec. 2, 2010", 13 pgs.

\* cited by examiner

| My Auctions | | |
|---|---|---|
| Search | My Auctions | Sign Out |
| BEST OFFERS | | 0 |
| BIDDING ON | | 1 |
| WON | | 4 |
| WINNING ON | | 1 |
| WATCHING | | 7 |
| LOST | | 4 |

Fig. 8

| My Auctions | | |
|---|---|---|
| Search | My Auctions | Sign Out |
| BEST OFFERS | | 0 |
| BIDDING ON | | 1 |
| WON | | 4 |
| WINNING ON | | 0 ★ 901 |
| WATCHING | | 7 |
| LOST | | 4 |

801 points to the table header. 802 brackets the rows. 800 indicates the overall figure.

Fig. 9

METHOD, SYSTEM AND APPARATUS FOR PROPAGATING DATA CHANGE NOTIFICATIONS

FIELD

The specification relates generally to computing device, and specifically to a method, system and apparatus for propagating data change notifications to a computing device.

BACKGROUND

Computing devices are increasingly used to access remote data that can change under suitable conditions. However, the technologies used to track changes of remote data are currently limited.

BRIEF DESCRIPTIONS OF THE DRAWINGS

Embodiments are described with reference to the following figures, in which:

FIGS. 8 and 9 depict a representation of an application for providing data change notifications, according to non-limiting embodiments;

DETAILED DESCRIPTION OF THE EMBODIMENTS

Figure 1:
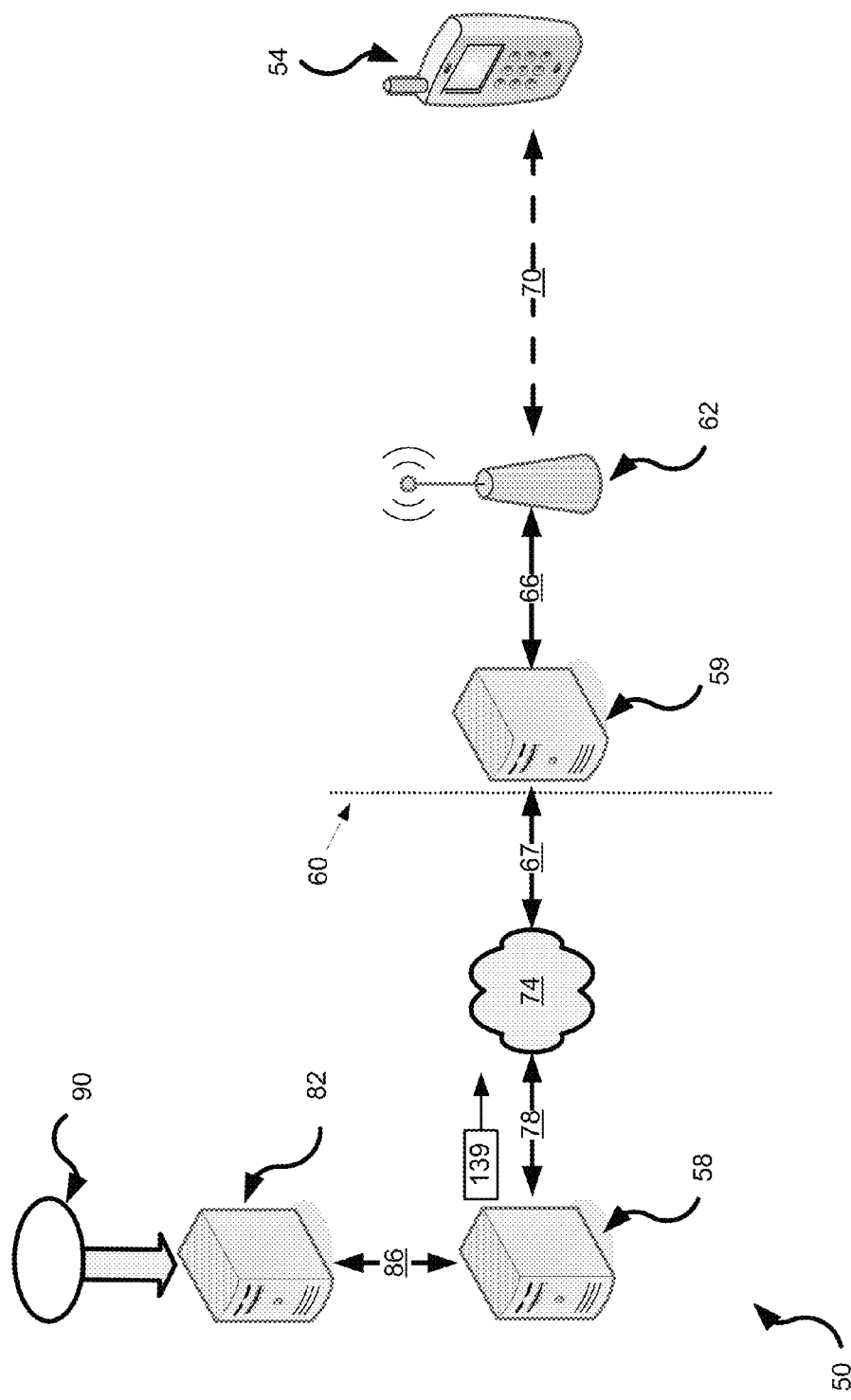
FIG. 1 depicts a system for propagating data change notifications, according to non-limiting embodiments.

A first aspect of the specification provides a method for propagating data change notifications, the method implementable at a computing device in communication with an intermediation server via a network. The method comprises receiving a data change notification from the intermediation server, the data change notification comprising an indication that a change has occurred to data at an originating content server. The method further comprises storing the data change notification in a destination location at the computing device. The method further comprises checking the destination location for the data change notification; and, when the data change notification is found, controlling an indicator to indicate that a change has occurred to the data.

The destination location can comprise at least one of a location in a memory device, a cache, and a location in a memory structure.

Checking the destination location for the data change notifications can occur via at least one of an application at the computing device, and a java applet at the computing device.

Checking the destination location for the data change notifications can occur via an embedded application embedded in a data structure for tracking the data. The indicator can comprise a portion of the data structure, such that only the portion is updated when the data change notification is found. The portion of the data structure can be displayed in a representation of the data structure at a display device associated with the computing device. The data structure can comprise HTML data, the embedded application can comprise a java applet embedded in the HTML data, and the indicator can comprise an icon displayed within the HTML data, such that only the indicator within the HTML data is updated rather than all of the HTML data.

The data change notification can further comprise at least a portion of the data. The method can further comprise causing a link to the least a portion of the data at the computing device to retrieve the least a portion of the data from the destination location rather than the originating content server when the link is actuated.

The indicator can be further controlled to expire after a given time period.

The indicator can comprise at least one of a visual indicator, an aural indicator, a mechanical indicator, a vibrating indicator, an LED (light emitting diode), a speaker, and a representation of the indicator at a display device associated with the computing device.

A second aspect of the specification provides a computing device for propagating data change notifications. The computing device comprises a processing unit interconnected with a memory device and a communication interface, the communication interface for communicating with an intermediation server via a network. The processing unit is enabled to: receive a data change notification from the intermediation server, the data change notification comprising an indication that a change has occurred to data at an originating content server; store the data change notification in a destination location at the computing device; check the destination location for the data change notifications; and, when the data change notification is found, control an indicator to indicate that a change has occurred to the data.

The destination location can comprise at least one of a location in the memory device, a cache, and a location in a memory structure.

The destination location can be checked for the data change notifications via at least one of an application, and a java applet.

The destination location can be checked for the data change notifications via an embedded application embedded in a data structure for tracking the data. The indicator can comprise a portion of the data structure, such that only the portion is updated when the data change notification is found. The portion of the data structure is displayed in a representation of the data structure at a display device associated with the computing device. The data structure can comprise HTML data, the embedded application can comprise a java applet embedded in the HTML data, and the indicator can comprise an icon displayed within the HTML data, such that only the indicator within the HTML data is updated rather than all of the HTML data.

The data change notification further can comprise at least a portion of the data. The processing unit can be further enabled to cause a link to the least a portion of the data at the computing device to retrieve the least a portion of the data from the destination location rather than the originating content server.

The processing unit can be further enabled to control the indicator to expire after a given time period.

The indicator can comprise at least one of a visual indicator, an aural indicator, a mechanical indicator, a vibrating indicator, an LED (light emitting diode), a speaker, and a representation of the indicator at a display device associated with the computing device.

A third aspect of the specification provides a method for propagating data change notifications to a computing device from an intermediation server, the method implementable at the intermediation server. The method comprises: determining that data at an originating content server has changed; and transmitting a data change notification to the computing device, the data change notification comprising an indication that a change has occurred to the data, the data changed notification for storage at a destination location at the computing device, such that when the data change notification is found by an application at the computing device, the computing device is triggered to control an indicator to indicate that a change has occurred to the data.

Determining that the data stored remote from the computing device has changed can comprise at least one of receiving at the intermediation server a notification that the data has changed from the originating content server, and requesting the data at least twice from the originating content server and determining that the data has changed between requests.

A fourth aspect of the specification provides an intermediation server for propagating data change notifications to a computing device. The intermediation server comprises a processing unit interconnected with a communication interface for communicating with the computing device and an originating content server. The processing unit is enabled to: determine that data at the originating content server has changed; and transmit a data change notification to the computing device, the data change notification comprising an indication that a change has occurred to the data, the data changed notification for storage at a destination location at the computing device, such that when the data change notification is found by an application at the computing device, the computing device is triggered to control an indicator to indicate that a change has occurred to the data.

To determine that the data stored remote from the computing device has changed the processing unit can be further enabled to at least one of receive a notification that the data has changed from the originating content server, and request the data at least twice from the originating content server and determine that the data has changed between requests.

A fifth aspect of the specification provides a system for propagating data change notifications. The system comprises a computing device in communication with an intermediation server, the intermediation server in communication with an originating content server. The computing device is enabled to: receive a data change notification from the intermediation server, the data change notification comprising an indication that a change has occurred to data at the originating content server; store the data change notification in a destination location at the computing device; check the destination location for the data change notifications; and, when the data change notification is found, control an indicator to indicate that a change has occurred to the data. The intermediation server is enabled to: determine that the data at the originating content server has changed; and transmit the data change notification to the computing device.

A sixth aspect of the specification provides a computer program product, comprising a computer usable medium having a computer readable program code adapted to be executed to implement a method for propagating data change notifications, the method implementable at a computing device in communication with an intermediation server via a network. The method comprises: receiving a data change notification from the intermediation server, the data change notification comprising an indication that a change has occurred to data at an originating content server; storing the data change notification in a destination location at the computing device; checking the destination location for the data change notifications; and, when the data change notification is found, controlling an indicator to indicate that a change has occurred to the data.

A seventh aspect of the specification provides a computer program product, comprising a computer usable medium having a computer readable program code adapted to be executed to implement a method for propagating data change notifications to a computing device from an intermediation server, the method implementable at the intermediation server. The method comprises: determining that data at an originating content server has changed; and transmitting a data change notification to the computing device, the data change notification comprising an indication that a change has occurred to the data, the data changed notification for storage at a destination location at the computing device, such that when the data change notification is found by an application at the computing device, the computing device is triggered to control an indicator to indicate that a change has occurred to the data.

Referring now to FIG. 1, a system for propagating data change notifications is indicated generally at 50. In a present embodiment system 50 comprises a portable electronic device 54, at least one intermediation server 58 and at least one push server 59, which can be located behind a firewall 60. A wireless base station 62 interconnects electronic device 54 and push server 59. A backhaul link 66 interconnects base station 62 with push server 59. At least one bearer path 70, typically wireless, can be used to interconnect base station 62 with electronic device 54. In a present exemplary embodiment, bearer path 70 can be based on one or more of Global System for Mobile communications (GSM), General Packet Radio Service (GPRS), Enhanced Data Rates for GSM Evolution (EDGE), the Third-generation mobile communication system (3G), Evolution-Data Optimized (EVDO), Institute of Electrical and Electronic Engineers (IEEE) 802.11 (WiFi) or other wireless protocols. In variations, path 70 can be wired.

Push server 59 is also connected to a network 74 via another backhaul link 67. Network 74 can be any type of network that can deliver content to device 54. In a present embodiment, network 74 is the Internet and connects to intermediation server 58 via a backhaul link 78. Intermediation server 58 connects to an originating content server 82 by another backhaul link 86.

Figure 2:
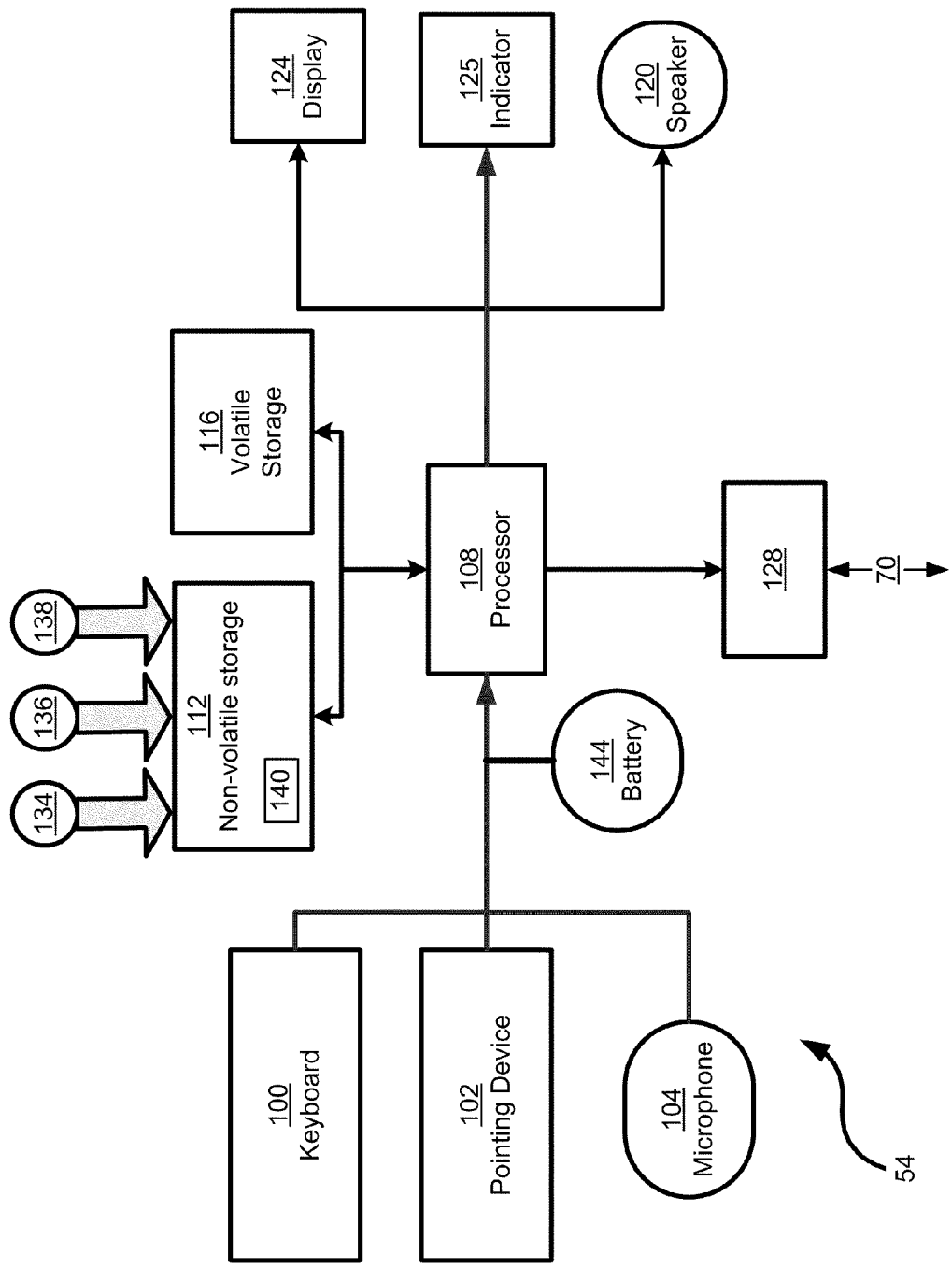
FIG. 2 depicts a device for providing data change notifications, according to non-limiting embodiments.

Referring now to FIG. 2, electronic device 54 can be any type of computing device that can be used in a self-contained manner and to interact with content available over network 74. Interaction includes displaying of information on electronic device 54 as well as to receive input at electronic device 54 that can in turn be sent back over network 74. It should be emphasized that the structure in FIG. 2 is purely exemplary, and contemplates a device that can be used for both wireless voice (e.g. telephony) and wireless data (e.g. email, web browsing, text) communications. In a present embodiment, electronic device 54 is a portable electronic device with the combined functionality of a personal digital assistant, a cell phone, and an email paging device. (Although variants on device 54 can include a palm top computer or laptop computer with a reduced screen such as an ASUS EEE from ASUSTek Computer Inc. of Taiwan. In yet further embodiments, variants on device 54 can include a personal computer or a laptop computer). Many known cellular telephone models, or variants thereof, are suitable for the present embodiment.

Device 54 thus includes a plurality of input devices which in a present embodiment includes a keyboard 100, a pointing device 102, and a microphone 104. Pointing device 102 can be implemented as a track wheel, trackball or the like. Other input devices, such as a touch screen are also contemplated. Input from keyboard 100, pointing device 102 and microphone 104 is received at a processor 108. Processor 108 is configured to communicate with a non-volatile storage unit 112 (e.g. Erasable Electronic Programmable Read Only Memory ("EEPROM"), Flash Memory) and a volatile storage unit 116 (e.g. random access memory ("RAM")). Programming instructions that implement the functional teachings of device 54 as described herein are typically maintained, persistently, in non-volatile storage unit 112 and used by processor 108 which makes appropriate utilization of volatile storage 116 during the execution of such programming instructions.

Processor 108 in turn is also configured to control a speaker 120, a display 124, and an indicator 125. Processor 108 also contains at least one network interface 128, which are implemented in a present embodiment as radios configured to communicate over bearer path 70. In general, it will be understood that interface(s) 128 is (are) configured to correspond with the network architecture that defines a particular bearer path 70. It should be understood that in general a wide variety of configurations for device 54 are contemplated.

In a present embodiment, device 54 is also configured to maintain a unique device identifier 134, a dashboard application 136, and an application 138 for checking a destination location 140, for example in non-volatile storage 112 and/or a cache, for data change notifications 139 received from intermediation server 58, as will described below. In any event, destination location 140 can comprise a portion of non-volatile storage 112 and/or a cache allocated for storing data change notifications. Destination location hence comprises at least one of a location in non-volatile storage 112 (and/or any other suitable memory device), and a location in a memory structure such a folder for storing data change notifications.

Device identifier 134 represents a unique absolute identifier of device 54. Exemplary device identifiers can include, but are not limited to, an International Mobile Equipment Identity (IMEI) identifier, or a BlackBerry™ PIN as commonly employed in BlackBerry™ devices from Research In Motion Inc., Waterloo, Ontario Canada. Other exemplary device identifiers will now occur to those skilled in the art. It is thus presently preferred that identifier 134 is absolute, non-changeable and non-transferable, being specifically assigned to the hardware of device 54.

Processor 108 is also configured to execute dashboard application 136, which is enabled to monitor data 90 at originating content server 82 and can comprise in a data structure for monitoring data 90. For example, in some embodiments, dashboard application 136 can cause device 54 to transmit a request for data 90 to push server 59, which passes the request to originating content server 82, which returns data 90, or a subset thereof, to device 54. However, this process is bandwidth intensive, especially when dashboard application 236 is frequently refreshed, as can be desired in some embodiments. For example, originating content server 82 can comprise an auctioning service where items are bought and sold on-line: when a device 54 (and/or an associated device) has caused bids to be placed on items being auctioned, it can be desirable to request and receive data relating to bids and/or bidding, for example number of items bid on, number of items won, number of items being watched, number of items lost, etc.

In exemplary non-limiting embodiments, dashboard application 136 comprises a browser application that can refresh automatically and/or on request, with data received from originating content server 82 comprising browser data and/or updates to browser data, including but not limited to data that can be displayed in HTML (hypertext markup language) format.

It is appreciated that in some embodiments, changes to data 90 can occur at originating content server 82 that may not result in a visual change to dashboard application 136. In other embodiments, a visual change to data in dashboard application 136 is not readily apparent. In any event, it can be desired to indicate when changes have occurred to data 90 without implementing the bandwidth intensive process of requesting and receiving data 90 and/or changes to data 90.

Hence, in these embodiments, data change notifications 139 can be received from intermediation server 58 and stored in a destination location, for example, in a memory structure stored in non-volatile storage 112. Application 138 is enabled to check the destination location for data change notifications 139 and in response control indicator 125 to indicate that a change has occurred to data 90, as will be described below.

In some embodiments, application 138 can be embedded in dashboard application 136. For example, in embodiments, where dashboard application 136 comprises a browser application running HTML code, application 138 can comprise a Java™ applet embedded in the HTML code. However, in other embodiments, application 138 can be a standalone application.

Processor 108 is configured to access configuration file 136 in order to establish initial settings for one or more applications, including dashboard application 136 and/or application 138, as well as to define any relevant communication gateways on network 74 that correspond to each of those applications. While a BlackBerry™ computing environment is not required to implement the present teachings, where a BlackBerry™ computing environment is used to implement device 54, then configuration file 138 can be implemented as a BlackBerry™ Service Book or as one or more specific entries within a BlackBerry™ Service Book.

Processor 108 is also configured to receive input from keyboard 100 relative to dashboard application 136 and to generate graphical interfaces on display 124. Processor 108 is further configured to send and receive data/requests/messages associated with dashboard application 136, via network 74 and bearer path 70, as will be discussed further below.

Device 54 also includes a battery 144 or other power supply. Battery 144 provides power to components within device 54.

Indicator 125 can comprise any suitable indicator for indicating that a change has occurred to data 90, including but not limited to at least one of a visual indicator, an aural indicator, a mechanical indicator, a vibrating indicator, an LED (light emitting diode), a speaker, and a virtual indicator at display device 124. Hence, in some embodiments, indicator 125 can be combined with speaker 120 and/or display 124. In embodiments where indicator 125 is combined with display 124 indicator 125 can comprise a virtual indicator displayed, for example, within a representation of dashboard application 136 and/or application 138 and/or a combination. In some embodiments, indicator 125 can comprise a portion of a data structure, for example, a data structure storing dashboard application data displayed at display 124 in a representation of dashboard application 136. For example, in these embodiments, indicator 125 can comprise an icon in the representation of dashboard application 136.

Figure 3:
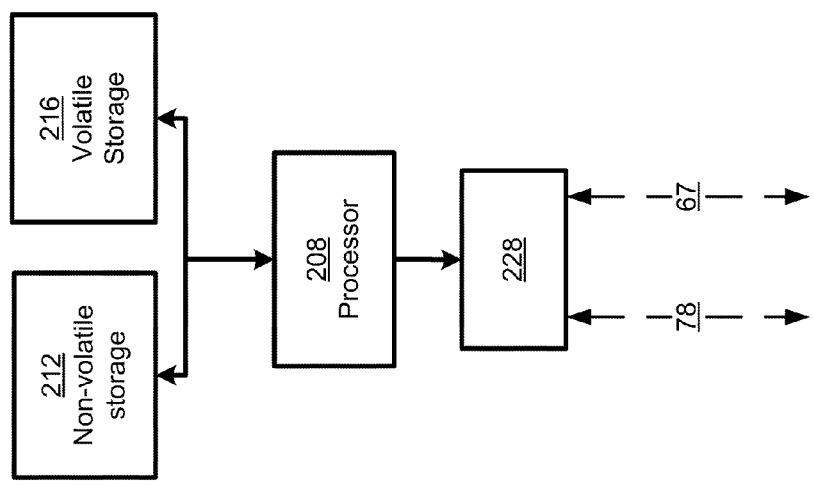
FIG. 3 depicts a server for propagating data change notifications, according to non-limiting embodiments.

Referring now to FIG. 3, intermediation server 58 can be based on any well-known server environment including a module that houses one or more central processing units 208, volatile storage (e.g. random access memory) 216, non-volatile storage 212 (e.g. hard disk devices) and at least one network interface 228 to enable intermediation server 58 to communicate over network 74 and with originating content server 82. For example, intermediation server 58 can be a Sun Fire V480 from Sun Microsystems, Inc. of Palo Alto Calif., running a UNIX operating system, and having four central processing units each operating at about nine-hundred megahertz and having about sixteen gigabytes of random access memory. However, it is to be emphasized that this particular server is merely exemplary, and a vast array of other types of computing environments for server 58 is contemplated.

Intermediation server 58 is enabled to determine that data 90 at originating content server 82 has changed, and in response generate and transmit data change notifications 139 to device 54, via push server 59. As such, in some embodiments, intermediation server 58 is enabled to request data 90 and/or a subset of data 90 from originating content server 82. By processing subsequently received versions of data 90 and/or a subset of data 90, intermediation server 58 can determine when changes have occurred to data 90. Alternatively, originating content server 82 can monitor data 90 and transmit a notification to intermediation server 58, which then determines that data 90 has changed by processing the notification.

Intermediation server 58 maintains a copy of device identifier 134, and is configured to send data change notification 129 that are addressed using device identifier 134, to device 54.

Push server 59 can be based can be based on the same or different computing environment as intermediation server 58, such as on any well-known server environment including a module that houses one or more central processing units, volatile storage (e.g. random access memory), non-volatile storage (e.g. hard disk devices) and at least one network interface to enable push server 59 to communicate over network 74 and with device 54. For example, intermediation server 58 can be a Sun Fire V480 from Sun Microsystems, Inc. of Palo Alto Calif., running a UNIX operating system, and having four central processing units each operating at about nine-hundred megahertz and having about sixteen gigabytes of random access memory. However, it is to be emphasized that this particular server is merely exemplary, and a vast array of other types of computing environments for server 58 is contemplated.

Push server 59 also maintains a copy of device identifier 134, and is configured to send data change notification 129 and messages that are addressed using device identifier 134, to device 54.

Push server 59 and device 54 are thus complementary to each other in that device identifier 134 is used by Push server 59 to send data change notifications 139 and messages to device 54. While a BlackBerry™ computing environment is not required to implement the present teachings, where a BlackBerry™ computing environment is used to implement system 50, then intermediation server 58 can be implemented as a "Relay" server that is specific to a BlackBerry™ computing environment.

Originating content server 82 can be based on the same or different computing environment as intermediation server 58. Originating content server 82 is enabled to maintain data 90, and to communicate with intermediation server 58. It is appreciated that in some embodiments, originating content server 82 can further communicate with any suitable number of computing device, which can interact with originating content server 82 to cause data 90 to change. In exemplary non-limiting embodiments, originating content server 82 can comprise an auction service, and hence data can be received from various computing devices, including but not limited to device 54, indicative of items that are to be auctioned, bids on items, and the like. Hence data 90 can change frequently based on how often bids are received and the items to be auctioned increase or decrease. Indeed, it is appreciated that dashboard application 136 only provides a small subset of data 90, for example the subset of data 90 that includes items associated with an account associated with device 54 and/or a user of device 54, including items being sold and/or bid on by a user of device 54.

Figure 4:
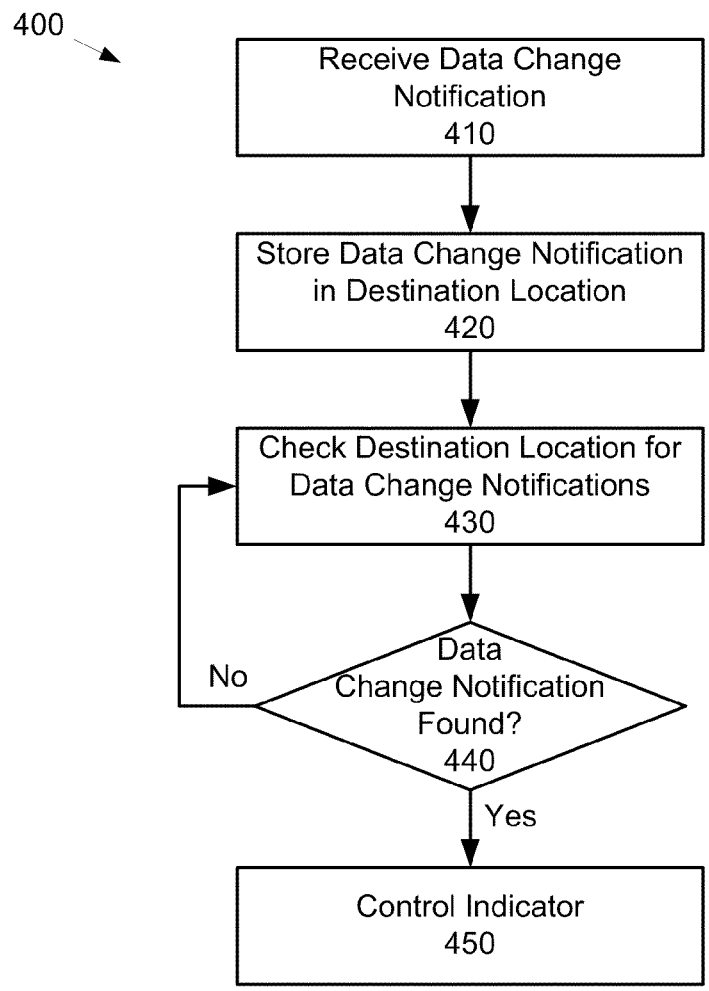
FIG. 4 depicts a flow diagram of a method for propagating data change notifications, according to non-limiting embodiments.

Attention is now directed to FIG. 4 which depicts a method 400 for propagating data change notifications. In order to assist in the explanation of method 400, it will be assumed that method 400 is performed using system 50. Specifically, it is understood that method 400 can be implemented in device 54. Furthermore, the following discussion of method 400 will lead to a further understanding of system 50 and its various components. However, it is to be understood that system 50 and/or method 50 can be varied, and need not work exactly as discussed herein in conjunction with each other, and that such variations are within the scope of present embodiments.

At block 410, data change notification 139 is received at device 54 from intermediation server 58, data change notification 139 comprising an indication that a change has occurred to data 90 at originating content server 82. It is understood that data change notification 139 is transmitted to device 54 without a request for data change notification 139 being transmitted to intermediation server 58. In other words, data change notification 139 is pushed to device 54.

Figure 5:
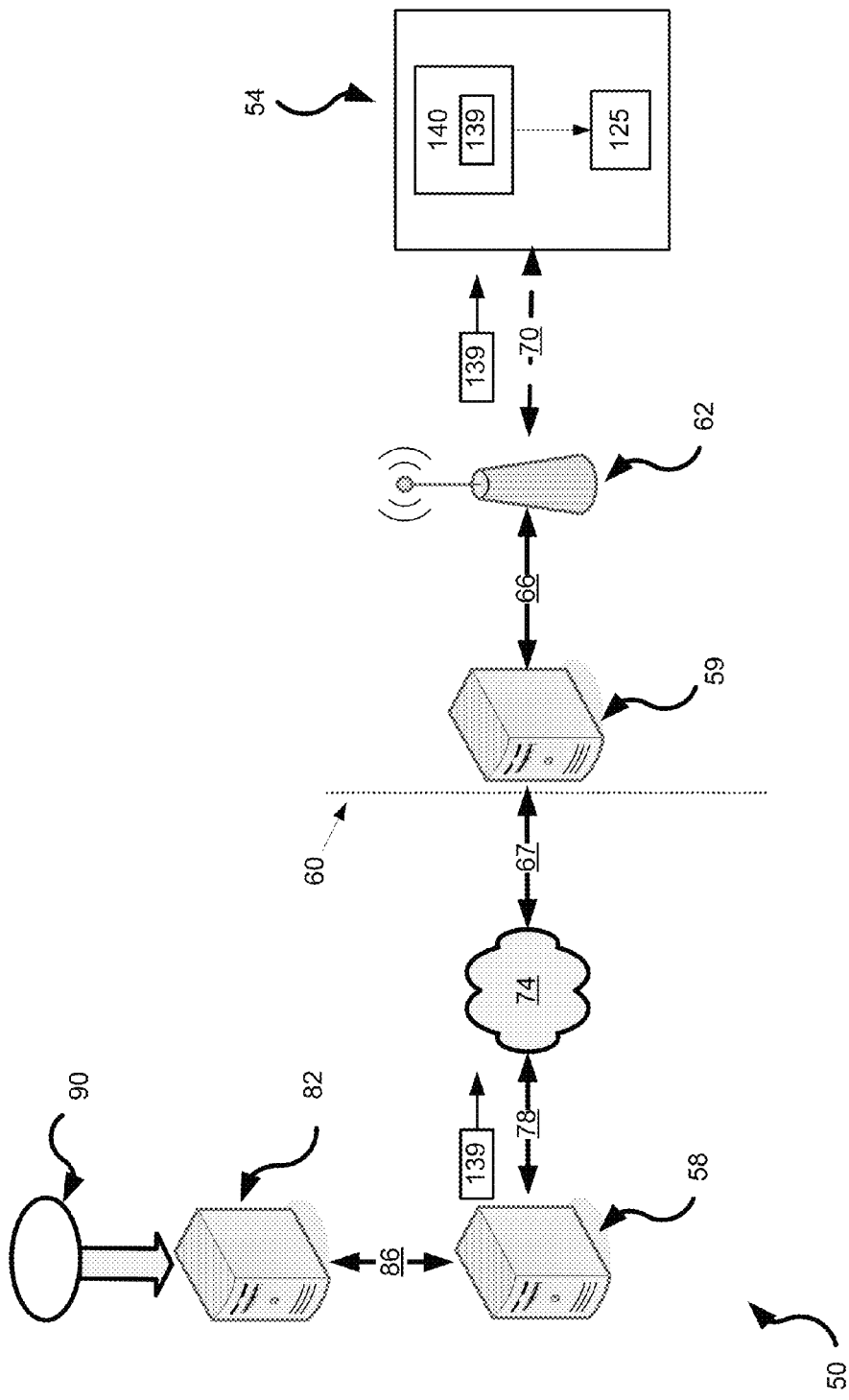
FIG. 5 depicts a system for propagating data change notifications, according to non-limiting embodiments.

At block 420, data change notification 139 is stored at destination location 140, for example as depicted in FIG. 5. FIG. 5 is substantially similar to FIG. 1 with like elements having like numbers, however destination location 140 and indicator 125 are depicted in device 54, though it is understood that device 54 further comprises the elements depicted in FIG. 2. It is understood that device 54 is enabled to determine data change notifications 139 indicate changes to data 90, and further enabled to store data change notifications 139 at destination location 140.

At block 430, destination location 140 is checked for data change notifications. For example, application 138, when processed, can check destination location 140 for data change notifications. When data change notification is found, at block 440, indicator 125 is controlled to indicate that a change has occurred to data 90. Otherwise blocks 430 to 440 repeat until data change notification 139 is found.

It is also appreciated that indicator 125 can also be controlled to cease indicating that a change has occurred to data 90. For example, after a given period of time and/or after receipt of input data from an input device at device 54, indicator 125 can be turned off.

In general, blocks 430 to 450 are implemented in application 138 and/or dashboard application 136 when application 138 is embedded in dashboard application 138.

It is appreciated that more than one data change notification 139 can be received at device 54, and that method 400 can repeat any suitable number of times to indicate a plurality of changes to data 90.

Furthermore, it is understood that control of indicator 125 can be customized based on data in data change notification 139. For example, again using the example of originating content server 92 comprising an auction service, when a bid has occurred on an item being watched by device 54 (and/or a user of device 54), indicator 125 can be controlled to indicate that a change has occurred to a watched item. Similarly, when a competing bid has occurred on an item being bid on by device 54 (and/or a user of device 54), indicator 125 can be controlled to indicate that a change has occurred to an item that has been bid on.

Figure 6:
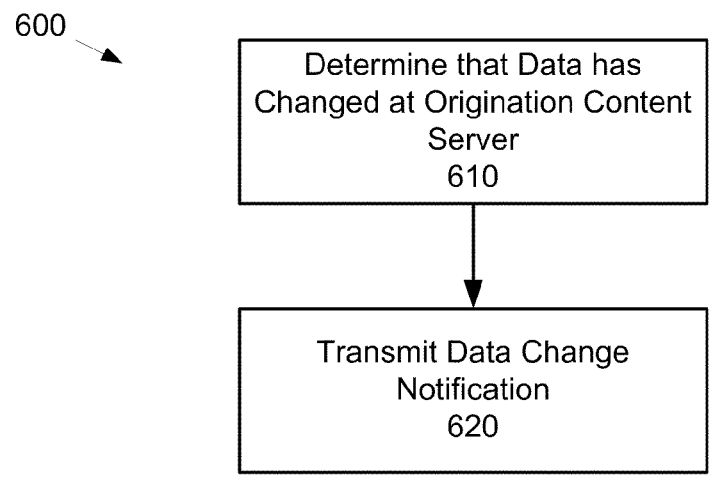
FIG. 6 depicts a flow diagram of a method for propagating data change notifications, according to non-limiting embodiments.

Attention is now directed to FIG. 6 which depicts a method 600 for propagating data change notifications to a computing device. In order to assist in the explanation of method 600, it will be assumed that method 600 is performed using system 50. Specifically, it is understood that method 600 can be implemented in intermediation server 58. Furthermore, the following discussion of method 600 will lead to a further understanding of system 50 and its various components. However, it is to be understood that system 50 and/or method 50 can be varied, and need not work exactly as discussed herein in conjunction with each other, and that such variations are within the scope of present embodiments.

At block 610, intermediation server 58 determines that data 90 at originating content server 82 has changed. In some embodiments block 610 can be implemented by receiving, from originating content server 82 at intermediation server 58, a notification that data 90 has changed. In other embodiments, block 610 can be implemented by intermediation server 58 requesting data 90, and/or a subset thereof, at least twice from originating content server 82 comparing each instance of data 90 and/or the subset. When each instance is different, intermediation server 58 determines that a change has occurred to data 90.

At block 620 data change notification 139 is generated and transmitted to device 54, which will be received at device 54 within method 400, as described above. Data change notification 139 comprises data indicative that a change has occurred to data 90, and can include data indicative of changes to data 90 associated with device 54.

It is appreciated that data change notification 139 is transmitted to push server 58, which in turn pushes data change notification 139 to device 54.

It is further appreciated that method 600 can be repeated any suitable number of times. For example, to provide near real-time data, method 600 can be repeated at least several times per minute It is further appreciated that in embodiments, where block 610 is implemented by intermediation server 58 requesting data 90, and/or a subset thereof, at least twice from originating content server 82, intermediation server 58 can be configured as a proxy server for device 54, in that intermediation server 58 requests browser data that could be requested by device 54 to display data 90, and/or a subset thereof, in a browser application.

Specific exemplary embodiments will now be described with reference to a push-data computing environment, such as a BlackBerry™ computing environment.

Push data computing environments can generally enable a suite of services that content providers and administrators of the push-data computing environment to manage the pushing of data to client applications running on devices such as BlackBerry™ devices. System 50 will hence enabled allow content providers, for example as represented by originating content server 82, to push near real time data to client applications on devices. Furthermore, system 50 can enable delivery of data through a secure existing infrastructure, such as that represented by firewall 60 and push server 59. Content providers are further enabled to push the application data to both enterprise and retail device users via a service book such as an ICS (Internet Connection Sharing) service book associated with a BlackBerry™ device. Push-data Services can also enable a reliable secure set of services that will enable content provider applications to manage subscription to push-data services.

Considering now embodiments where originating content server 82 is comprises an auction service provided by a content provider. It is appreciated that platform notifications (e.g. notification of changes to data 90) are triggered by events such as the ending of a listing or the creation of a transaction within the auction service. Platform notifications are not identical in intent, or content, to email messages that buyers and sellers might get when an item is listed, bid on, or purchased. However, they can contain some of the same data that appears in those messages.

Unlike API (application programming interface) calls, which handle data using a request-response model, platform notifications for some content provider auction services use an asynchronous style of operation in which the data is pushed from originating content server 82 when it is available. That is, when you notification preferences are set and the content provider is provided with URLs (uniform resource locators), email addresses or the like, then originating content server 82 delivers notifications to the associated locations as events occur.

In exemplary embodiments, then, such platform notifications can be pushed to intermediation server 58 where the platform notification can be converted to a PAP (Push Access Protocol) message (i.e. data change notification 139) and then sent to data push infrastructure (i.e. push server 59). Push server 59 then further pushes the data change notification 139 to the device 54.

In these embodiments, originating content server 82 comprises a server side component dealing with platform notification APIs of the content provider. A platform notification API deals with event handling and generates platform notifications (which can comprise SOAP (Simple Object Access Protocol) responses).

Further, in these embodiments, intermediation server 58 comprises a push proxy, which can be hosted either by the content provider or an entity associated with push server 58. It is appreciated that intermediation server 58 can be combined with one of originating content server 82 and push server 62. In any event, intermediation server 58 receives the platform notifications from originating content server 82 and remodels data as a PAP message according to what is processable by device 54, e.g. based on templates. The PAP message (data change notification 139) is then pushed to push server 59. Hence, intermediation server 58, can comprise a stateless proxy component that does not require any sort of capacity or load planning from the content provider or the push-data infrastructure. Further, intermediation server 58 can subscribe to platform notifications from originating content server 82 using the platform notification API, for example via an attribute SetNotificationPreferences; preferences already set can be checked with a GetNotificationPreferences attribute. The platform notification usage can be monitored with a GetNotificationsUsage attribute.

Further, in these embodiments, push server 59 can comprise at least one enterprise server, such as BlackBerry™

Enterprise Servers that are hosted and maintained by an enterprise associated with device 54. Push server 59 is generally enabled for queuing of alerts, acknowledgements and actual push to device 54. The details are available above.

Application 138 comprises a component that listens for incoming notifications (e.g. data change notifications 139) by checking destination location 140. Application 138 can be deployed as a library in dashboard application 136.

Figure 7:
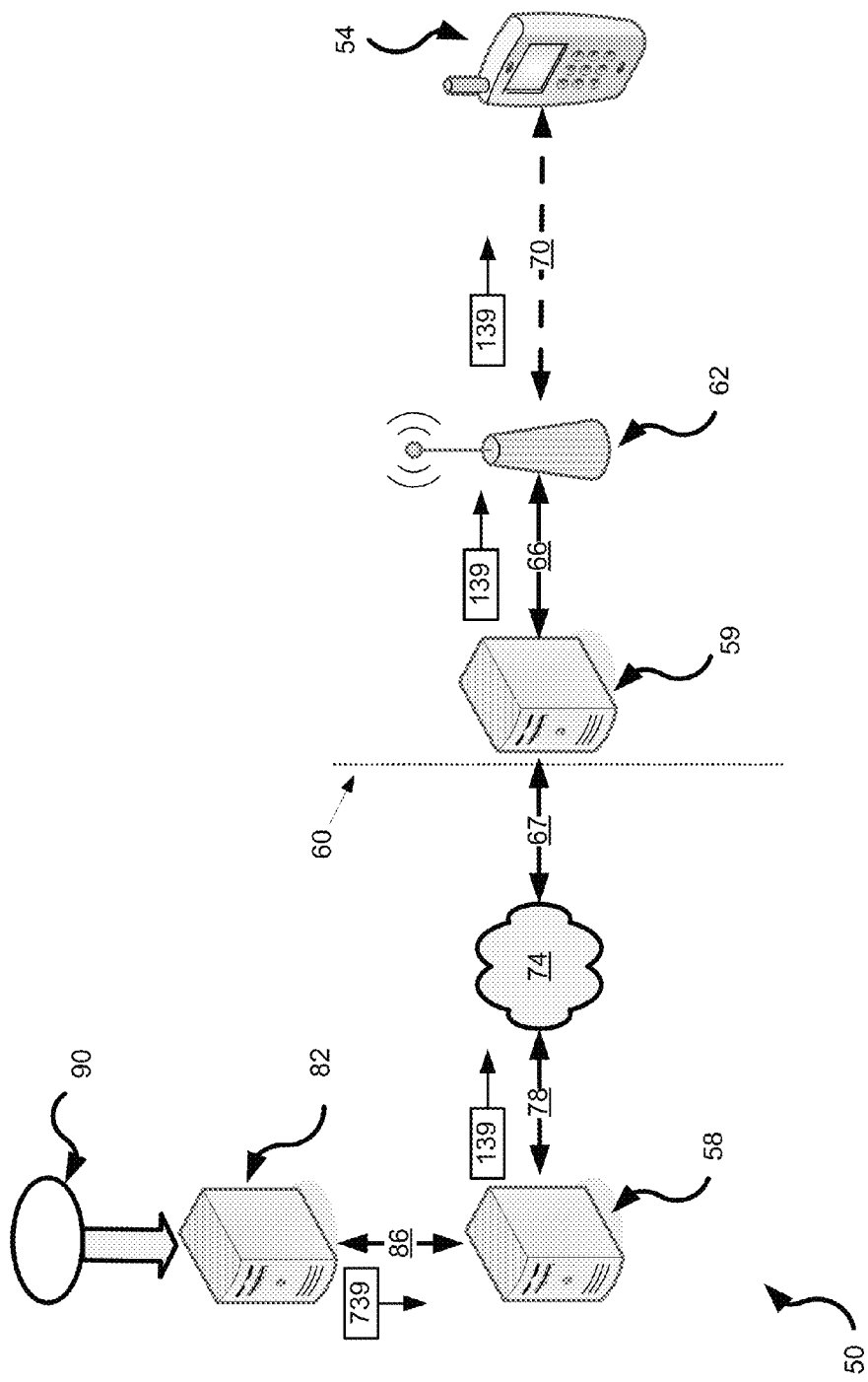
FIG. 7 depicts a system for propagating data change notifications, according to non-limiting embodiments.

A non-limiting example will now be described within the context of the push-data computing environment, when originating content server 82 comprises an auction service, and with reference to FIG. 7, which is substantially similar to FIG. 1, with like elements having like numbers.

In the example, it is assumed that notifications for being "outbid" on an item have been subscribed to at originating content server 82 by a user device 54.

At device 54, or any other suitable device, a user logs into originating content server 82 and bids on an item. The bid can be placed via a browser and/or an auction client, which can include but is not limited to dashboard application 136. It is assumed that after at least one successful bid attempt, the user is outbid by another user. Being outbid triggers an outbid notification from originating content server 82 which can comprise a SOAP message 739 which contains a field <externalUserData> which comprises a PIN (product identification number) of device 54 so that data change notification 139 can be pushed to device 54. SOAP message 739 is pushed to the intermediation server 58, and contains.

Intermediation server 58 receives SOAP message 739 and based on a template extract data from SOAP message 139 to form a PAP message. It can also extracts the field value of <externalUserData> which was set during a SetNotificationPreferencesRequest event for an authentication token. The value of <externalUserData> is extracted, decrypted if encrypted, and used to set an address-value in the PAP message, which can include the PIN. Once the PAP message is formed, it is pushed on to push server 59 as data change notification 139.

Push server 59 then pushes data change notification 139 to device 54 via the PIN, or any other suitable data. Push server 59 can send a transport level acknowledgement to intermediation server 58.

Device 54 listens for message on an identified port receives data change notification 139. An acknowledgment can be sent to push server 59, which can in turn send an acknowledgement to intermediation server 58 (and in some embodiments originating content server 82).

At device 54, application 138, which can comprise a JAVA applet in dashboard application 136, listens for incoming data change notifications by checking destination location 140. In some of these embodiments, destination location 140 comprises a listening module in application 138 and/or dashboard application 136. When data change notification 139 is found, a JavaScript callback is called which in turn updates dashboard application 136.

Figure 13:
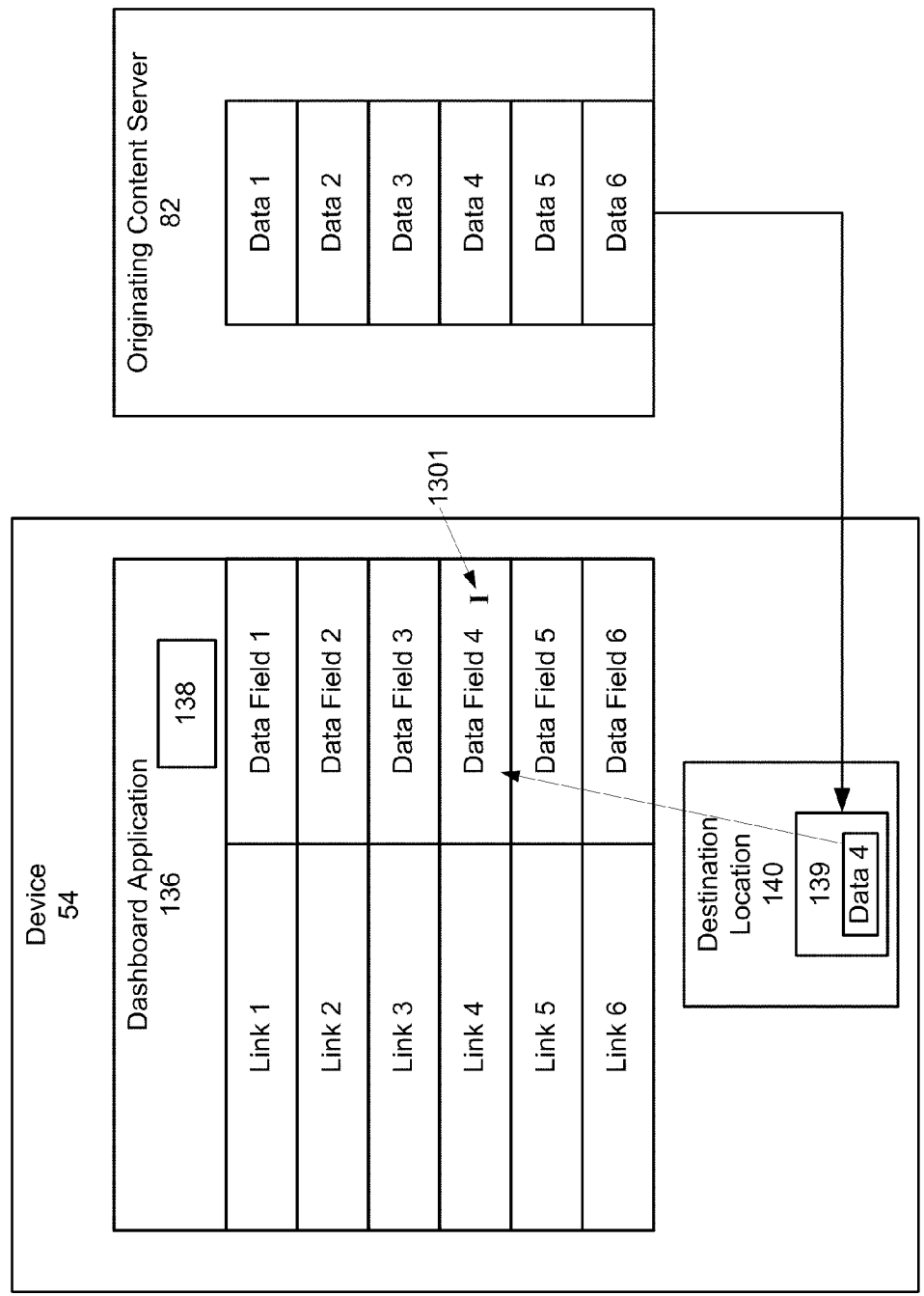

For example, attention is directed to FIG. 13, which depicts a schematic of an implementation of dashboard application 136 with application 138 embedded therein, at device 54, along with destination location 140. FIG. 13 further depicts originating content server 82. While FIG. 3 does not depict links between device 54 and originating content server 82, as in FIG. 1, it is appreciated that device 54 and originating content server 82 can communicate via the previously described links. Furthermore, while not all elements of device 54 and originating content server 54 are depicted, it is appreciated that that all elements previously described are present and device 54 and originating content server 82.

In the depicted example, it is appreciated that dashboard application 136 comprises Link 1, Link 2 ... Link 6 (generically a link and collectively links), with each link being associated with a respective Data Field 1, Data Field 2 ... Data Field 6 (generically a data field and collectively data fields). Each data field corresponds to Data 1, Data 2 ... Data 6 stored at originating content server 82. It is appreciated that data stored at originating content server 82 changes, as described above, for example when originating content server 82 comprises an auction service and Data 1, Data 2 ... Data 6 correspond to items, bids and the like associated device 54 and/or a user thereof.

In the depicted example, when a link is activated (for example via an input device), data for the corresponding data field is retrieved from originating content server 82 and stored in the corresponding data field, as represented by the respective arrows between data at originating content server 82 and each data field. In some embodiments, activation of a link further causes a list of details of the corresponding data field to be retrieved from originating content server 82, such as a corresponding list of items and/or bids of interest, when originating data server 82 comprises and auction service.

However, when application 138 finds a data change notification 139 stored at destination location, an indication 1301 is provided that data at originating content server 82 has changed, as in FIG. 13. Hence, in these embodiments, indicator 125 referred to previously with reference to FIG. 2 comprises a virtual indicator in the form of indication 1301. In any event, in FIG. 13, substantially similar to FIG. 12, with like elements having like numbers, it is appreciated that Data 4 has been changed. In some embodiments, data change notification 139 also comprises the data that has changed (e.g. Data 4 as depicted) and the data received in data change notification 139 is stored in the respective Data Field 4. Furthermore, application 138 also causes the behaviour of dashboard application 136 to change: when Link 4 is activated, Data 4 is retrieved from destination location 140 rather than originating content server 82.

This approach to notifications generally reduces overall traffic between device 54 and originating content server 82, as well in the links and networks there between, as the approach obviates the need for requests/responses to obtain data updates.

Figure 12:
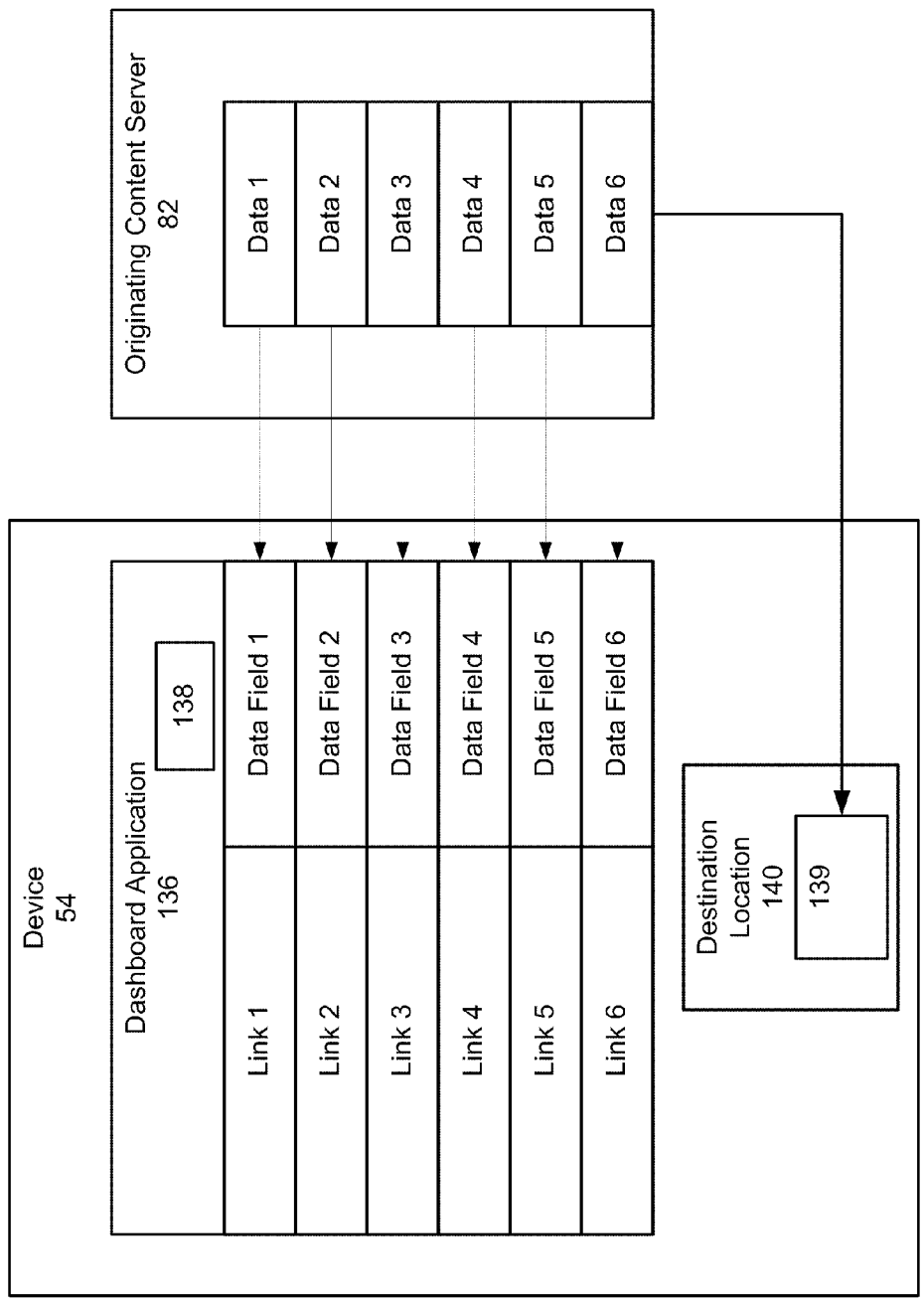
FIGS. 12 and 13 depict a schematic of an application for providing data change notifications, according to non-limiting embodiments.

It is also appreciated that the data change notification 139 is representative of a state change of data stored at originating content server 82, as well as a state change to data stored in dashboard application 136: for example, in the implementation described with reference to FIGS. 12 and 13, Data Field 4 has undergone a state change as the data stored therein changes. Hence, the indication 1301 (i.e. indicator 125 of FIG. 2) denotes both a change in activity/new activity, and that there is no need to make another network call to fetch the data stored therein.

Present embodiments also serve to identify which section of dashboard application 136 recently had activity. From a user perspective, it can be appreciated that a user of device 54, wishes to monitor, for example, his/her items, bids etc. via dashboard application 136, again reverting to the non-limiting example of originating content server 82 comprising an auction service. However, the user can be busy with work, family etc., and may not be able to follow up on bids in a timely fashion. Assuming a competing bid was recently made on an item, data change notification 139 can indicate that the competing bid was placed and either explicitly or inherently indicating that the user was outbid. By viewing indicator 1301 at dashboard application 136, the user he/she has been outbid on one of the items without opening an outbid items list. In another example, another data change notification 139 can be received indicating that an item has been won, and indicator 1301 at dashboard application 136 is updated accordingly by application 138. Hence, the user is always updated on which data in dashboard application 136 is the newest, without the dashboard application 136 having to be completely refreshed.

In another example, when a user has a lot of unread outbid notifications, received, for example via e-mail, that the user already knows about. In this instance, the indicator may not appear as there would be no or little use in grabbing a user's attention to something he has ignored in the first place. For example, originating content server 82 can monitor when e-mail notifications are transmitted and how often e-mail notifications lead to a retrieval of details of an associated event at originating content server 82 are retrieved: if details are rarely retrieved (e.g. below a threshold number), then the data change notifications 139 for related events are not transmitted. Alternatively, application 138 can interface with an e-mail application (not depicted) at device 54 and determine if there are unread notifications pertaining to data change notification 139 and hence prevent indicator 1301 from being provided and/or controlled.

In yet further embodiments, when indicator 1301 is controlled in response to receiving 139 data change notification, and the associated link is not activated, application 139 can determine that there is no interest in data change/data update and either remove indicator 1301 after a given time period and/or remove indicator 1301 from dashboard application 136 when it is closed and reopened.

In yet further embodiments, data associated with data change notification 139 can have a short life. For example, a data change notification 139 associated with a watched item whose auction is ending within a given time period (e.g. 15 minutes) can comprise data representative of the given time period. In some of these embodiments, indicator 1301 can expire after the given time period, for example be removed from dashboard application 136, as the data associated with it has expired.

Attention is now directed to FIG. 8 which depicts a specific exemplary representation 800 of dashboard application 136 displayed at display 124. Representation 800 comprises an identifying header 801, and any suitable number of virtual buttons for triggering interactions with originating content server 82 (as depicted, "Search", "My Auctions", and "Sign Out"). Furthermore, a body 802 includes a plurality of lines, each line comprising a link to associated data in the form of descriptive text providing information on numbers "BEST OFFERS", items being bid on ("BIDDING ON"), items "WON", auctions being won but that aren't yet complete ("WINNING ON"), items being watched ("WATCHED"), and number of items "LOST". Furthermore, each line in body 802 can comprise an HTML link to data available via originating content server 82 corresponding to the text in each line. Body 802 can include any suitable type of data and in some embodiments can be configurable. As depicted in FIG. 8, data change notification 139 has not yet been found, and it is assumed that only one item is being bid on, which is currently the winning bid.

In any event, once data change notification 139 is found, representation 800 is updated as in FIG. 9 as data change notification 139 is determined to indicate that the user has been outbid on an item. Hence, the number next to "WINNING ON" decreases to "0" (as depicted), and an indicator in the form of an icon 901 appears next to the number next to "WINNING ON" to indicate that the data on this line has changed. In these embodiments, indicator 125 comprises icon 901.

The JavaScript call-back (e.g. application 138) ensures content in representation 800 does not have to be reloaded to view the latest changes. For example, where dashboard application 136 comprises a browser and hence data displayed in dashboard application 136 comprises browser data such as HTML data and/or a webpage, then the page dos not have to be reloaded to get the updates for the browser data.

The design pattern for the JavaScript callback is inversion of control: i.e. if a new event is triggered then the JavaScript callback calls another module, instead of the parent module polling for information related to the event. The flow of information is hence from JAVA to JavaScript. This asynchronous update keeps device 54 updated on activities at originating content server 82, that are related to dashboard application 136/browser data which might effect a future interaction decision.

While described with reference to an auction service, it is appreciated that live web content updates using push-data services present an easy and bandwidth efficient way to updates in a browser based solution without having to do a push pull/request response/page reload.

As described above, in some embodiments, the functionality of the intermediation server 58 can be summarized as follows:
 1. Accept SOAP notifications from platform notifications.
 2. Extract a device PIN from a <userdata> field in <externalUserData> (for example via a platformNotification API) in the SOAP notification payload/
 3. Create a PAP payload as per a template (e.g. see below).
 4. Send the created PAP payload to push server 59 as data change notification 139.

A non-limiting sale notification example of a PAP payload template is provided as follows:

```
<?xml version="1.0"?>
<!DOCTYPE pap PUBLIC "-//WAPFORUM//DTD PAP 1.0//EN"
"http://www.openmobilealliance.org/tech/DTD/pap_1.0.dtd">
<pap>
<push-message push-id="pushID:-131203621"
source-reference="49-58B84a5aeawerew"
deliver-before-timestamp="2020-12-31T23:59:59Z">
<!--
Optional attribute used for notifications. Use if the content provider
has been setup to receive notifications during the setup on the push server.
ppg-notify-requested-to="/"
-->
<address address-value="20dbb2d4"/>
<quality-of-service delivery-method="confirmed"/>
</push-message>
</pap>
--asdlfkjiurwghasf
Content-Type: text/plain
<pushMessage>
<title>OutBid </title> <from>ContentProvider</from>
<notificationType>Out Bid</notificationType>
<pushText>
<Show>
CONTENT PROVIDER MESSAGE
</Show>
<pushText>
</pushMessage>
```

Figure 10:
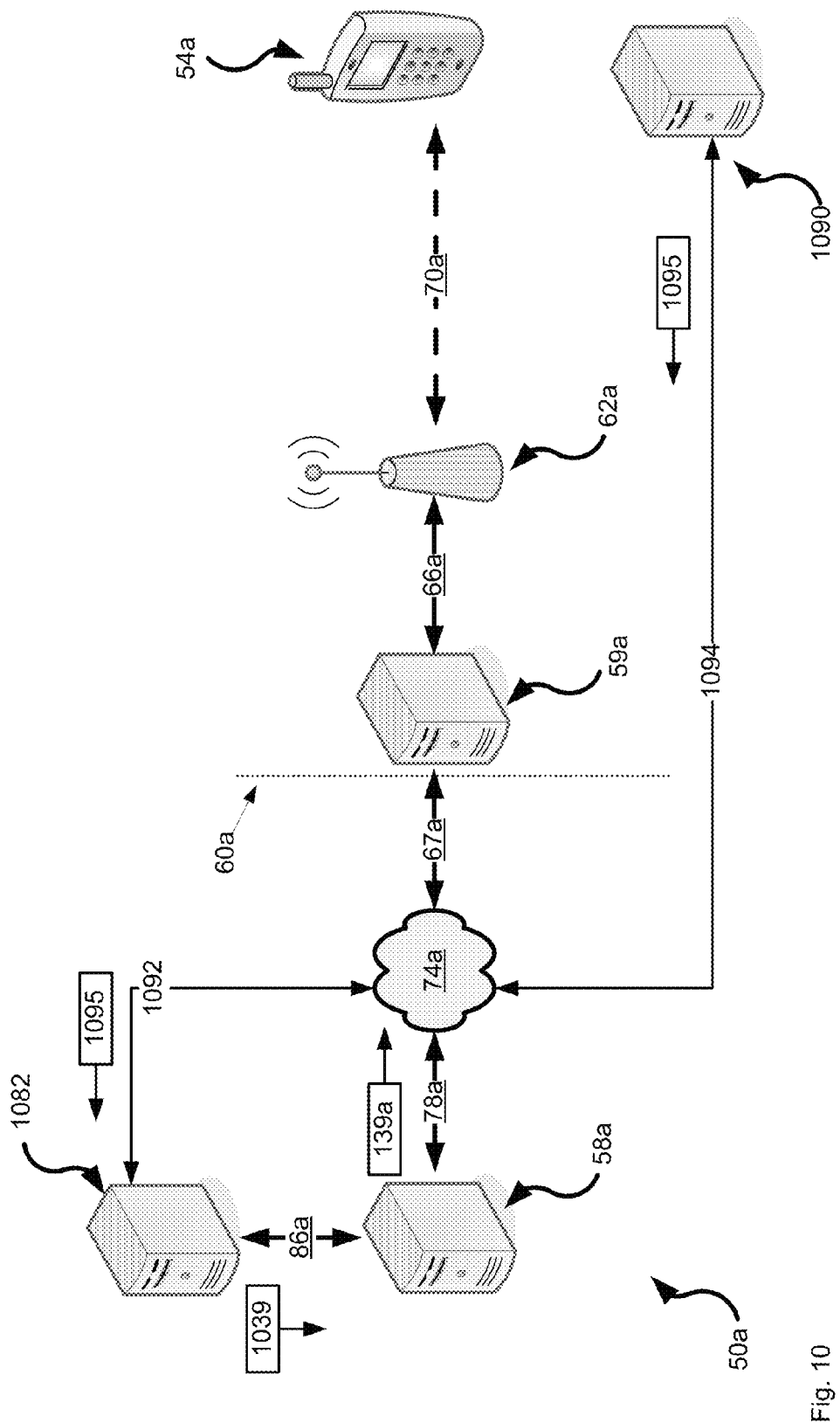
FIG. 10 depicts a system for propagating data change notifications, according to non-limiting embodiments.

Variations of the foregoing are contemplated. For example, FIG. 10 shows system 50*a* which is a variation on system 50 and like elements in system 50*a* include like references to their counterparts in system 50, except followed by the suffix "a". However, in system 50*a*, originating content server 82 has been replaced by a backup server 1082 in communication with a data storage device 1090 via network 74*a* (or any other suitable network) and suitable backhaul links 1092 and 1094. Each of backup server 1082 and storage server 1090 can be based on the same or different computing environment as intermediation server 58 as described above.

It is appreciated that data stored at storage server 1090 is backed up at backup server 1082 periodically and/or as desired in a backup event and/or a synchronization event. For example, storage server 1090 can comprise a server of an enterprise that stores data associated with the enterprise, and backup server 1082 can comprise a server associated with a remote data storage service. It is appreciated that in some embodiments, backups can occur nightly, and/or hourly, and/or every 15 minutes by transmitting data 1095 to server 1082. Furthermore, it is understood that after an initial seeding event, in which all data stored at server 1090 is copied to backup server 1082, then data 1095 transmitted in a backup/synchronization event can comprise a delta between the data stored at server 1090 and the data stored at server 1082. It is appreciated that data 1095 can be transmitted via a plurality of packets over a period of time such that a backup/synchronization event occurs in a series of smaller transfers.

Figure 11:
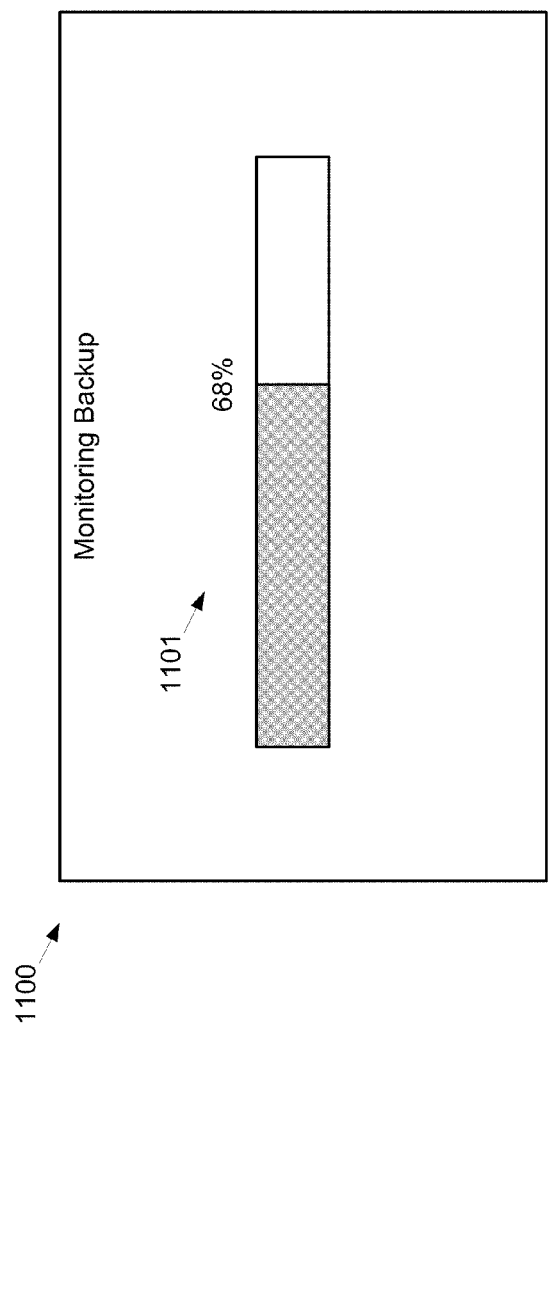
FIG. 11 depicts a representation of an application for providing data change notifications, according to non-limiting embodiments.

In any event, it is appreciated that in these embodiments, device 54*a* can comprise an application for monitoring backups/synchronizations so that the progress of a backup/synchronization event can be monitored. A non-limiting embodiment of a representation 1100 of such a monitoring application is provided in FIG. 11, representation 1100 displayed on a display at device 54*a*, similar to display 124 described above. Representation 1100 comprises an indicator 1101 which indicates changes to data stored at backup server 1082, and specifically the progress of a backup/synchronization event between server 1090 and server 1082.

In these embodiments, backup server 1082 is enabled to push messages 1039 to intermediation server 58*a*, push messages 1039 comprising data indicative of the progress of a backup/synchronization event. Such progress can be determined as in a first transfer of data to server 1082, server 1090 can indicate the total amount of data 1095 that is to be backed up. In any event, intermediation server 58*a* formats the payload of data change notifications 139*a* to indicate the progress of the backup/synchronization event using the payload from messages 1039 and pushes data change notifications 139*a* to push server 59*a*, which in turn pushes data change notifications 139*a* to device 54*a*. Data change notifications 139*a* are monitored by an application for monitoring data change notices as described above and updates to the representation 1100 are provided without having to request progress data from server 1082. In this manner, the progress of the backup/synchronization event can be monitored without having to do a push pull/request response/page reload, and using existing push infrastructure as represented by push server 59*a*.

To provide near real-time updates, any suitable number messages 1039 can be pushed to intermediation server 58*a*, at any suitable frequency. Furthermore, monitoring of backup/synchronization events can be controlled by transmitting control data to server 1082 from device 54*a* indicating whether messages 1039 are to be pushed or not.

Those skilled in the art will appreciate that in some embodiments, the functionality of devices 54, 54*a*, and servers 58, 58*a*, 59, 59*a*, 82, 1082 and 1090 can be implemented using pre-programmed hardware or firmware elements (e.g., application specific integrated circuits (ASICs), electrically erasable programmable read-only memories (EEPROMs), etc.), or other related components. In other embodiments, the functionality of devices 54, 54*a*, and servers 58, 58*a*, 59, 59*a*, 82, 1082 and 1090 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for propagating data change notifications, said method implementable at a computing device in communication with an intermediation server via a network, said method comprising:

receiving, by said computing device, a data change notification from said intermediation server, said data change notification comprising an indication that a change has occurred to data at an originating content server;

storing said data change notification in a destination location at said computing device;

checking, by said computing device, said destination location for said data change notifications;

when said data change notification is found, determining whether change indicators corresponding to previous data change notifications are ignored, said previous data change notifications relating to said data change notification;

when the determination is affirmative, preventing an indicator from indicating that a change has occurred to said data; and when the determination is negative, controlling, by said computing device, the indicator to indicate that the change has occurred to said data.

2. The method of claim 1, wherein said destination location comprises at least one of a location in a memory device, a cache, and a location in a memory structure.

3. The method of claim 1, wherein said checking said destination location for said data change notifications occurs via at least one of an application at said computing device, and a java applet at said computing device.

4. The method of claim 1, wherein said checking said destination location for said data change notifications occurs via an embedded application embedded in a data structure for tracking said data.

5. The method of claim 4, wherein said indicator comprises a portion of said data structure, such that only said portion is updated when said data change notification is found.

6. The method of claim 5, wherein said portion of said data structure is displayed in a representation of said data structure at a display device associated with said computing device.

7. The method of claim 6, wherein said data structure comprises HTML data, said embedded application comprises a java applet embedded in said HTML data, and said indicator comprises an icon displayed within said HTML data, such that only said indicator within said HTML data is updated rather than all of said HTML data.

8. The method of claim 1, wherein said data change notification further comprises at least a portion of said data.

9. The method of claim 8, further comprising causing a link to said least a portion of said data at said computing device to retrieve said least a portion of said data from said destination location rather than said originating content server when said link is actuated.

10. The method of claim 1, wherein said indicator is further controlled to expire after a given time period.

11. The method of claim 1, wherein said indicator comprises at least one of a visual indicator, an aural indicator, a mechanical indicator, a vibrating indicator, an LED (light emitting diode), a speaker, and a representation of said indicator at a display device associated with said computing device.

12. A computing device for propagating data change notifications, comprising:
    a processing unit interconnected with a memory device and a communication interface, said communication interface for communicating with an intermediation server via a network, said processing unit enabled to:
        receive a data change notification from said intermediation server, said data change notification comprising an indication that a change has occurred to data at an originating content server;
        store said data change notification in a destination location at said computing device;
        check said destination location for said data change notifications;
        when said data change notification is found, determine whether change indicators corresponding to previous data change notifications are ignored, said previous data change notifications relating to said data change notification;
        when the determination is affirmative, preventing an indicator from indicating that a change has occurred to said data; and
        when the determination is negative, control the indicator to indicate that the change has occurred to said data.

13. The computing device of claim 12, wherein said destination location comprises at least one of a location in said memory device, a cache, and a location in a memory structure.

14. The computing device of claim 12, wherein said destination location is checked for said data change notifications via at least one of an application, and a java applet.

15. The computing device of claim 12, wherein said destination location is checked for said data change notifications via an embedded application embedded in a data structure for tracking said data.

16. The computing device of claim 15, wherein said indicator comprises a portion of said data structure, such that only said portion is updated when said data change notification is found.

17. The computing device of claim 16, wherein said portion of said data structure is displayed in a representation of said data structure at a display device associated with said computing device.

18. The computing device of claim 17, wherein said data structure comprises HTML data, said embedded application comprises a java applet embedded in said HTML data, and said indicator comprises an icon displayed within said HTML data, such that only said indicator within said HTML data is updated rather than all of said HTML data.

19. The computing device of claim 12, wherein said data change notification further comprises at least a portion of said data.

20. The computing device of claim 19, wherein said processing unit is further enabled to cause a link to said least a portion of said data at said computing device to retrieve said least a portion of said data from said destination location rather than said originating content server.

21. The computing device of 12, wherein said processing unit is further enabled to control said indicator to expire after a given time period.

22. The computing device of claim 12, wherein said indicator comprises at least one of a visual indicator, an aural indicator, a mechanical indicator, a vibrating indicator, an LED (light emitting diode), a speaker, and a representation of said indicator at a display device associated with said computing device.

23. A method for propagating data change notifications to a computing device from an intermediation server, said method implementable at said intermediation server, said method comprising:
    determining that data at an originating content server has changed; and
    transmitting a data change notification to said computing device, said data change notification comprising an indication that a change has occurred to said data, said data changed notification for storage at a destination location at said computing device, such that when said data change notification is found by an application at said computing device, said computing device is triggered to control an indicator to indicate that a change has occurred to said data,
    wherein the transmitting of said data change notification to said computing device is prevented upon determination that change indicators corresponding to previous data change notifications are ignored at said computing device, said previous data change notifications relating to said data change notification.

24. The method of claim 23, wherein said determining that said data stored remote from said computing device has changed comprises at least one of receiving at said intermediation server a notification that said data has changed from said originating content server, and requesting said data at least twice from said originating content server and determining that said data has changed between requests.

25. An intermediation server for propagating data change notifications to a computing device, said intermediation server comprising:
    a processing unit interconnected with a communication interface for communicating with said computing device and an originating content server, said processing unit enabled to:
        determine that data at said originating content server has changed; and
        transmit a data change notification to said computing device, said data change notification comprising an indication that a change has occurred to said data, said data changed notification for storage at a destination location at said computing device, such that when said data change notification is found by an application at said computing device, said computing device is triggered to control an indicator to indicate that a change has occurred to said data, wherein the transmission of said data change notification to said computing device is prevented upon determination that change indicators corresponding to previous data change notifications are ignored at said computing device, said previous data change notifications relating to said data change notification.

26. The intermediation server of claim 25, wherein to determine that said data stored remote from said computing device has changed said processing unit is further enabled to at least one of receive a notification that said data has changed from said originating content server, and request said data at least twice from said originating content server and determine that said data has changed between requests.

27. A system for propagating data change notifications, comprising:
a computing device in communication with an intermediation server, said intermediation server in communication with an originating content server, wherein said computing device is enabled to:
receive a data change notification from said intermediation server, said data change notification comprising an indication that a change has occurred to data at said originating content server;
store said data change notification in a destination location at said computing device;
check said destination location for said data change notifications; and, when said data change notification is found,
control an indicator to indicate that a change has occurred to said data, and said intermediation server is enabled to:
determine that said data at said originating content server has changed; and
transmit said data change notification to said computing device, wherein the transmission of said data change notification to said computing device is prevented upon determination that change indicators corresponding to previous data change notifications are ignored at said computing device, said previous data change notifications relating to said data change notification.

28. A computer program product, comprising a non-transitory computer usable medium having a computer readable program code adapted to be executed to implement a method for propagating data change notifications, said method implementable at a computing device in communication with an intermediation server via a network, said method comprising:
receiving, by said computing device, a data change notification from said intermediation server, said data change notification comprising an indication that a change has occurred to data at an originating content server;
storing said data change notification in a destination location at said computing device;
checking, by said computing device, said destination location for said data change notifications;
when said data change notification is found, determining whether change indicators corresponding to previous data change notifications are ignored, said previous data change notifications relating to said data change notification;
when the determination is affirmative, preventing an indicator from indicating that a change has occurred to said data; and
when the determination is negative, controlling, by said computing device, the indicator to indicate that the change has occurred to said data.

29. A computer program product, comprising a non-transitory computer usable medium having a computer readable program code adapted to be executed to implement a method for propagating data change notifications to a computing device from an intermediation server, said method implementable at said intermediation server, said method comprising:
determining, at said intermediation server, that data at an originating content server has changed; and
transmitting a data change notification to said computing device, said data change notification comprising an indication that a change has occurred to said data, said data changed notification for storage at a destination location at said computing device, such that when said data change notification is found by an application at said computing device, said computing device is triggered to control an indicator to indicate that a change has occurred to said data,
wherein the transmitting of said data change notification to said computing device is prevented upon determination that change indicators corresponding to previous data change notifications are ignored at said computing device, said previous data change notifications relating to said data change notification.

* * * * *

UNITED STATES PATENT AND TRADEMARK OFFICE
CERTIFICATE OF CORRECTION

PATENT NO. : 8,799,349 B2  Page 1 of 1
APPLICATION NO. : 12/708355
DATED : August 5, 2014
INVENTOR(S) : Aggarwal et al.

It is certified that error appears in the above-identified patent and that said Letters Patent is hereby corrected as shown below:

In the Claims

In column 18, line 15, in Claim 21, before "12", insert --claim--, therefor

Signed and Sealed this
Ninth Day of December, 2014

Michelle K. Lee
*Deputy Director of the United States Patent and Trademark Office*